(12) United States Patent
Xu et al.

(10) Patent No.: US 10,524,191 B2
(45) Date of Patent: Dec. 31, 2019

(54) SC-MCCH SENDING METHOD AND DEVICE, AND SC-PTM RECEIVING METHOD AND DEVICE

(71) Applicant: ZTE CORPORATION, Shenzhen (CN)

(72) Inventors: Hui Xu, Shenzhen (CN); Zijiang Ma, Shenzhen (CN); Chen Lu, Shenzhen (CN); Yutang Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/752,395

(22) PCT Filed: May 24, 2016

(86) PCT No.: PCT/CN2016/083167
§ 371 (c)(1),
(2) Date: Feb. 13, 2018

(87) PCT Pub. No.: WO2017/028581
PCT Pub. Date: Feb. 23, 2017

(65) Prior Publication Data
US 2019/0007891 A1    Jan. 3, 2019

(30) Foreign Application Priority Data
Aug. 14, 2015 (CN) .......................... 2015 1 0502055

(51) Int. Cl.
*H04W 48/10* (2009.01)
*H04W 4/06* (2009.01)
(Continued)

(52) U.S. Cl.
CPC .............. *H04W 48/10* (2013.01); *H04W 4/06* (2013.01); *H04W 76/11* (2018.02); *H04W 76/40* (2018.02);
(Continued)

(58) Field of Classification Search
CPC ....... H04W 4/06; H04W 48/10; H04W 76/11; H04W 76/40; H04W 84/042; H04W 72/005; H04L 1/1812; H04L 1/1893
See application file for complete search history.

(56) References Cited

U.S. PATENT DOCUMENTS

2013/0107784 A1   5/2013 Chang
2016/0227383 A1*  8/2016 Lin .......................... H04W 4/08
(Continued)

FOREIGN PATENT DOCUMENTS

CN     101742410 A     6/2010
CN     102056342 A     5/2011
(Continued)

OTHER PUBLICATIONS

European Search Report: EU Application No. 16836445.3, EU extended European Report pursuant to Rule 62 EPC, dated Mar. 18, 2018, pp. 1-12.
(Continued)

*Primary Examiner* — Mewale A Ambaye
(74) *Attorney, Agent, or Firm* — Cantor Colburn LLP

(57) ABSTRACT

The present disclosure provides an SC-MCCH sending method and device, and an SC-PTM receiving method and device. The SC-MCCH sending method includes: generating, by a base station, SC-MCCH information for indicating configuration information of a Single Cell Point-to-Multipoint (SC-PTM) service; and sending, by the base station, the SC-MCCH information; wherein the SC-MCCH information comprises: a mapping relationship between an identifier (TMGI) of the SC-PTM service and a Group Radio Network Temporary Identifier (G-RNTI), and information of a time domain location where the SC-PTM service is.

18 Claims, 5 Drawing Sheets

(51) Int. Cl.
*H04W 76/40* (2018.01)
*H04W 76/11* (2018.01)
*H04W 72/00* (2009.01)
*H04L 1/18* (2006.01)
*H04W 84/04* (2009.01)

(52) U.S. Cl.
CPC .......... *H04L 1/1812* (2013.01); *H04L 1/1893* (2013.01); *H04W 72/005* (2013.01); *H04W 84/042* (2013.01)

(56) References Cited

U.S. PATENT DOCUMENTS

| 2017/0273057 | A1* | 9/2017 | Lee | H04W 4/06 |
| 2018/0077690 | A1* | 3/2018 | Park | H04L 5/0053 |
| 2018/0206289 | A1* | 7/2018 | Kim | H04W 4/06 |
| 2018/0270622 | A1* | 9/2018 | Kim | H04W 4/06 |

FOREIGN PATENT DOCUMENTS

| CN | 103650561 A | 3/2014 |
| WO | 2015046939 A1 | 4/2015 |

OTHER PUBLICATIONS

Huawei et al. "Group-RNTI for SC-PTM," 3GPP TSG-RAN WG2 Meeting #89bis, Bratislava, Slovakia, Apr. 20-24, 2015, pp. 1-2.

Potevio, "Consideration of SC-FTM RNTI and SC-PTM configuration," 3GPP TSG-RAN WG2 #90, Fukuoka, Japan, May 25-29, 2015, pp. 1-3.

Qualcomm Incorporated, "SC-PTM Configuration Signalling," 3GPF TSG-RAN WG2 Meetinging #90, Fukuoka, Japan, May 25-29, 2015, pp. 1-3.

* cited by examiner

SC-MCCH SENDING METHOD AND DEVICE, AND SC-PTM RECEIVING METHOD AND DEVICE

CROSS-REFERENCE TO RELATED APPLICATION

This application is based upon and claims priority to PCT Application No. PCT/CN2016/083167, filed May 24, 2016, which is based upon and claims priority to Chinese Patent Application No. 201510502055.7, filed Aug. 14, 2015, the entire contents of which are incorporated herein by reference.

TECHNICAL FIELD

The present disclosure relates to the communication field, and more particularly, to a SC-MCCH sending method and device, and a SC-PTM receiving method and device.

BACKGROUND

With the rapid development of the Internet and the popularization of large-screen multi-function mobile terminals, a large number of mobile data multimedia services and various high bandwidth multimedia services have emerged, such as a video conferencing, television broadcasting, video on demand, advertising, online education and interactive games. This on the one hand meets the needs of mobile users for more services, and on the other hand brings a new business growth point for mobile operators. These mobile data multimedia services require that multiple users can receive the same data at the same time. Compared with common data services, the mobile data multimedia services have the characteristics of large data volume, long duration, sensitivity to delay and the like.

In order to make effective use of mobile network resources, the 3rd Generation Partnership Project (3GPP) proposes a Multimedia Broadcast Multicast Service (MBMS), which is a technology of transmitting data to multiple target mobile terminals from one data source. This technology can enable sharing of resources among networks (including core networks and access networks), and improves the utilization ratio of network resources (especially air interface resources). The MBMS service defined by the 3GPP can not only achieve multicast and broadcast of low-rate plain text message, but also can achieve broadcast and multicast of high-speed multimedia services, and thus can provide a wide range of rich video, audio and multimedia services, which undoubtedly conforms to the future trend of mobile data development and provides a better business prospect for the development of 3G.

The characteristics of the MBMS service include that the service data traffic is large, mobile terminals receive data for a long duration, and an average data rate is constant. The above characteristics determine that the scheduling of the MBMS services and configuration of control signaling are semi-static, that is, the scheduling information and the control signaling information of the MBMS services are both unchanged for a "long term", and such information is periodically transmitted by a MBMS Control Channel (MCCH), the information being collectively referred to as MCCH information. There may be multiple MCCHs in an evolved MBMS (eMBMS) system, and each MCCH corresponds to a different multimedia Broadcasting single frequency network (MBMS Single Frequency Network, which is abbreviated as MBSFN) area, in which only control information of the MBMS service transmitted in the corresponding MBSFN area is carried.

A MBMS notification message is used to describe whether the MCCH information changes. For a user equipment (UE) in an idle mode (Radio Resource Control Idle, which is abbreviated as RRC Idle) or a UE in a connected mode (RRC Connected), only the MBMS notification message needs to be monitored to know whether the MCCH information has changed, so as to realize a selective reception of the MCCH information. That is, new MCCH information is received only when the MCCH information changes. Since an amount of information of the MBMS notification message is much smaller than that of the MCCH information, the user equipment selectively receives the MCCH information, which can effectively save resources and reduce power consumption. The MCCH notification information is carried on a Physical Downlink Control Channel (PDCCH) of a designated MBSFN subframe and is sent periodically, and the corresponding MBSFN subframe and transmission period are indicated by a system message (for example, SIB13).

In a Long Term Evolution (LTE) system, a user equipment (or a terminal, a UE for short) is informed that a session about a certain MBMS service is to be started (session start) or a counting request is initiated by a network side. Downlink Control Information (DCI for short) and a MBMS-Radio Network Temporary Identifier (M-RNTI for short) may be first sent on the PDCCH. The UE further reads a specific MCCH message according to related information in the DCI, which is called an MCCH change notification mechanism. Specific service configuration parameters, such as a service ID, a Radio Link Control (RLC), a Media Access Control (MAC), and a physical layer configuration parameter of the service, are sent on the MCCH.

Currently, the MBMS technology is introduced in the LTE system. The transmissions of the control signaling and the user data of the MBMS service are separated, which are respectively referred to as a Control Plane (CP) and a User Plane (UP). The control plane controls the sending of the user plane data by controlling the start, update and end of the service and realizes the sending of basic MBMS services. The MBMS service is sent in a fixed-size MBSFN area that may be statically or semi-statically configured. The PDCCH is indication information for parsing Physical Downlink Shared Channel (PDSCH) data. Therefore, the PDCCH is before the PDSCH (data domain) in the time domain, that is, the PDCCH occupies first 1 to 4 symbols of one subframe. The information transmitted in the PDCCH is called Downlink Control Information (DCI), which is used to indicate information such as resource configuration and uplink resource grant of the PDSCH. The CRC of the tail of the PDCCH is 16 bits, and is scrambled by using a specific Radio Network Temporary Identifier (RNTI). The RNTI is used to identify the UE or is used for specific uses. The UE performs a blind detection on the PDCCH of the received subframe. The blind detection is to search a bit sequence obtained after descrambling by the UE without priori information, and then obtain the required control signaling.

At present, a research topic of single-cell MBMS is proposed in LTE-A, in which a single-cell MBMS service is transmitted on a Physical Downlink Shared Channel (PDSCH). During the research, it was found that the Single-Cell Multicast Control Channel (SC-MCCH) is carried and sent on the PDSCH, and the Multicast Control Channel (MCCH) in the MBSFN area is carried and sent on the Physical Broadcast Channel (PMCH). The sending locations are completely different. Thus, the sending method of the MCCH is no longer suitable for the sending of SC-MCCH.

At present, no effective solution for scheduling SC-PTM services has been given in the related art.

This section provides background information related to the present disclosure which is not necessarily prior art.

SUMMARY

Embodiments described herein provide a SC-MCCH sending method and device, and a SC-PTM receiving method and device, in order to at least solve the problem in related art that there is no effective solution for scheduling SC-PTM services.

According to an embodiment, there is provided a Single Cell Multicast Control Channel (SC-MCCH) sending method, including: generating, by a base station, SC-MCCH information for indicating configuration information of a Single Cell Point-to-Multipoint (SC-PTM) service; and sending, by the base station, the SC-MCCH information; wherein the SC-MCCH information includes: a mapping relationship between a Temporary Mobile Group Identifier (TMGI) of the SC-PTM service and a Group Radio Network Temporary Identifier (G-RNTI), information of a time domain location where the SC-PTM service is, and a Modulation and Coding Scheme (MCS) of the SC-PTM service.

In an embodiment described herein, the SC-MCCH information further includes at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

In an embodiment described herein, the SC-PTM service includes: a currently ongoing SC-PTM service and a to-be-ended SC-PTM service; the to-be-ended SC-PTM service refers to a SC-PTM service which is to be ended in one or more next SC-MCCH modification periods; the currently ongoing SC-PTM service and the to-be-ended SC-PTM service are distinguished using different indicators in the SC-MCCH information; and for the to-be-ended SC-PTM service, the number of the SC-MCCH modification periods at which the SC-PTM service is ended is indicated in the SC-MCCH information.

In an embodiment described herein, the sending, by the base station, the SC-MCCH information includes: sending, by the base station, the SC-MCCH information on a Physical Downlink Shared Channel (PDSCH) of a unicast subframe.

In an embodiment described herein, when a plurality of SC-MTCHs need to be multiplexed on a Media Access Control (MAC) layer, the SC-MCCH information includes: a mapping relationship between the TMGI and Logical Channel Identifiers (LCIDs) of the SC-MTCHs.

In an embodiment described herein, the information of the time domain location where the SC-PTM service is includes: configuration information of a wireless frame and a wireless subframe where the SC-PTM service is.

In an embodiment described herein, the counting request is used for requesting a User Equipment (UE) in a cell which receives the SC-PTM service or is interested in receiving the SC-PTM service to return a feedback, so as to calculate the number of the UEs which receive the SC-PTM service or are interested in receiving the SC-PTM service, and the UEs include at least one of a UE in an RRC-connected state and a UE in an RRC-idle state.

In an embodiment described herein, the channel quality feedback request is used for requesting a User Equipment (UE) to report a channel quality of a downlink.

In an embodiment described herein, the channel quality feedback request includes at least one of: a Channel Quality Indicator (CQI) threshold by which a CQI is needed to be fed back, an identifier of a User Equipment (UE) which needs to feed back the CQI, and indication information which indicates whether a UE in an idle state feeds back the CQI.

In an embodiment described herein, the channel quality feedback request includes at least one of: indication information which indicates whether to feed back at least one of an acknowledge response (ACK) and a negative acknowledge response (NACK) of a Hybrid Automatic Repeat request (HARQ), and indication information which indicates whether a UE in an idle state feeds back at least one of the ACK and/or the NACK of the HARQ.

In an embodiment described herein, the SC-MCCH indication information of the neighboring cell includes: a frequency of the SC-PTM service of the neighboring cell, and an identifier of the SC-PTM service of the neighboring cell.

In an embodiment described herein, after the base station sends the SC-MCCH information, the method further includes: listening or receiving, by a User Equipment (UE), the SC-MCCH information at a location which is indicated in SC-MCCH configuration information of a system broadcast message.

In an embodiment described herein, the listening or receiving, by a User Equipment (UE), the SC-MCCH information at a location which is indicated in SC-MCCH configuration information of a system broadcast message, includes: after the UE is powered on, or after a cell is reselected, or after the UE is switched to a new cell, reading, by the UE, the SC-MCCH information; or after the UE monitors a SC-MCCH update notification, reading, by the UE, updated SC-MCCH information.

In an embodiment described herein, after the listening or receiving, by the User Equipment (UE), the SC-MCCH information at the location which is indicated in the SC-MCCH configuration information of the system broadcast message, the method further includes:

receiving, by the UE, a required SC-PTM service according to a content of the SC-MCCH information.

In an embodiment described herein, the receiving, by the UE, the SC-PTM service according to the SC-MCCH information, includes: receiving, by the UE, a unicast subframe as indicated by the information of the time domain location in the SC-MCCH information; performing a mask operation on the unicast subframe by using a G-RNTI of interest and verifying a Cyclic Redundancy Check (CRC) value, by the UE; and when verification is successful, reading, by the UE, the SC-PTM service corresponding to the G-RNTI of interest according to frequency domain scheduling information as indicated in a Physical Downlink Control Channel (PDCCH) of the unicast subframe.

According to another embodiment described herein, there is provided a Single Cell Point-to-Multipoint (SC-PTM) service receiving method, including: receiving, by a User Equipment (UE), Single Cell Multicast Control Channel (SC-MCCH) information, wherein the SC-MCCH information is used for indicating configuration information of the SC-PTM service; and receiving, by the UE, the SC-PTM service according to the SC-MCCH information; wherein the SC-MCCH information includes: a mapping relationship between a Temporary Mobile Group Identifier (TMGI) of the SC-PTM service and a Group Radio Network Temporary Identifier (G-RNTI), information of a time domain location where the SC-PTM service is, and a Modulation and Coding Scheme (MCS) of the SC-PTM service.

In an embodiment described herein, the SC-MCCH information further includes at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

In an embodiment described herein, the receiving, by the UE, the SC-MCCH information, includes: receiving, by the UE, the SC-MCCH information on a Physical Downlink Shared Channel (PDSCH) of a unicast subframe.

In an embodiment described herein, the channel quality feedback request includes at least one of: a Channel Quality Indicator (CQI) threshold by which a CQI is needed to be fed back, an identifier of a User Equipment (UE) which needs to feed back the CQI, and indication information which indicates whether a UE in an idle state feeds back the CQI.

In an embodiment described herein, the channel quality feedback request includes at least one of: indication information which indicates whether to feed back at least one of an acknowledge response (ACK) and/or a negative acknowledge response (NACK) of a Hybrid Automatic Repeat request (HARQ), and indication information which indicates whether a UE in an idle state feeds back at least one of the ACK and/or the NACK of the HARQ.

In an embodiment described herein, the receiving, by the UE, the SC-MCCH information includes: listening or receiving, by the UE, the SC-MCCH information at a location which is indicated in SC-MCCH configuration information of a system broadcast message.

In an embodiment described herein, the receiving, by the UE, the SC-MCCH information includes: after the UE is powered on, or after a cell reselection, or after the UE is switched to a new cell, reading the SC-MCCH information by the UE; or after the UE monitors a SC-MCCH update notification, reading the updated SC-MCCH information by the UE.

In an embodiment described herein, the receiving, by the UE, the SC-PTM service according to the SC-MCCH information includes: receiving, by the UE, a unicast subframe as indicated by the information of the time domain location in the SC-MCCH information; performing a mask operation on the unicast subframe by using G-RNTI of interest and verifying a Cyclic Redundancy Check (CRC) value, by the UE; and when verification is successful, reading, by the UE, SC-PTM service data corresponding to the G-RNTI of interest according to frequency domain scheduling information as indicated in a Physical Downlink Control Channel (PDCCH) of the unicast subframe.

According to another embodiment described herein, there is provided a Single Cell Multicast Control Channel (SC-MCCH) sending device, applied in a base station. The device includes: a generation module configured to generate SC-MCCH information for indicating configuration information of a Single Cell Point-to-Multipoint (SC-PTM) service; and a sending module configured to send the SC-MCCH information; wherein the SC-MCCH information includes: a mapping relationship between a Temporary Mobile Group Identifier (TMGI) of the SC-PTM service and a Group Radio Network Temporary Identifier (G-RNTI), information of a time domain location where the SC-PTM service is, and a Modulation and Coding Scheme (MCS) of the SC-PTM service.

In an embodiment described herein, the SC-MCCH information further includes at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

According to another embodiment described herein, there is provided a Single Cell Point-to-Multipoint (SC-PTM) service receiving device, applied in a User Equipment (UE). The device includes: a first receiving module configured to receive Single Cell Multicast Control Channel (SC-MCCH) information, wherein the SC-MCCH information is used for indicating configuration information of the SC-PTM service; and a second receiving module configured to receive the SC-PTM service according to the SC-MCCH information; wherein the SC-MCCH information includes: a mapping relationship between a Temporary Mobile Group Identifier (TMGI) of the SC-PTM service and a Group Radio Network Temporary Identifier (G-RNTI), information of a time domain location where the SC-PTM service is, and a Modulation and Coding Scheme (MCS) of the SC-PTM service.

In an embodiment described herein, the SC-MCCH information further includes at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

According to another embodiment described herein, there is provided a base station including the Single Cell Multicast Control Channel (SC-MCCH) sending device as described above.

According to another embodiment described herein, there is provided a user equipment including the Single Cell Point-to-Multipoint (SC-PTM) service receiving device as described above.

According to an embodiment described herein, there is provided a computer storage medium for storing executable instructions which are configured to carry out the SC-MCCH sending methods in the above embodiments.

According to an embodiment described herein, there is provided a computer storage medium for storing executable instructions which are configured to carry out the SC-PTM receiving methods in the above embodiments.

In the embodiments of the present disclosure, the base station generates SC-MCCH information for indicating configuration information of a SC-PTM service and the base station sends the SC-MCCH information. The SC-MCCH information includes at least one of a mapping relationship between the TMGI and the LCID of the SC-MTCH, a counting request, a channel quality feedback request, and SC-MCCH indication information of a neighboring cell. The embodiments of the present disclosure can solve the problem in related art that there is no effective solution for scheduling SC-PTM services. Thus, the present disclosure can realize scheduling of the SC-PTM services.

This section provides a summary of various implementations or examples of the technology described in the disclosure, and is not a comprehensive disclosure of the full scope or all features of the disclosed technology.

BRIEF DESCRIPTION OF THE DRAWINGS

The drawings described herein, which constitute a part of the present disclosure, are provided for understanding of the present disclosure. The exemplary embodiments and descriptions thereof are for the purpose of explaining the present disclosure, but are not intended to unduly limit the present disclosure. In the drawings.

DETAILED DESCRIPTION

The present disclosure will be described below with reference to drawings and embodiments. It should be understood that if there is no conflict, embodiments and features thereof in the present disclosure can be combined with each other.

It should be noted that the terms "first", "second" and so on in the description and claims are used for distinguishing similar items, but are not used for describing a specific sequence or order.

Figure 1:
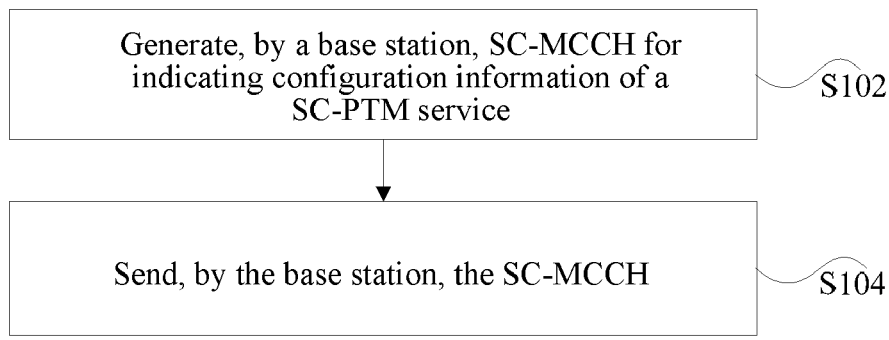
FIG. 1 is a flowchart showing a SC-MCCH sending method according to an embodiment.

According to one or more embodiments described further, the technical solutions described herein provide a Single Cell Multicast Control Channel (SC-MCCH) sending method. FIG. 1 is a flowchart showing a SC-MCCH sending method according to an embodiment. As shown in FIG. 1, the flow includes the following steps.

In step S102, a base station generates a SC-MCCH for indicating configuration information of a SC-PTM service.

In step S104, the base station sends the SC-MCCH.

The SC-MCCH includes: a mapping relationship between an identifier (TMGI) of the SC-PTM service and an identifier (G-RNTI) of the SC-PTM service on the physical layer, information of a time domain location where the SC-PTM service is, and a Modulation and Coding Scheme (MCS) of the SC-PTM service.

By the above steps, according to the mapping relationship, the information of the time domain location, and the MCS as indicated in the SC-MCCH, after receiving the SC-MCCH, a UE may obtain the SC-PTM service on a corresponding time-frequency resource. The UE further processes the SC-PTM service according to the modulation and coding scheme indicated by the MCS, and finally obtains the service data. In this way, the scheduling of the SC-PTM service is realized. It can be seen that the base station sends the SC-MCCH carrying the above information, which can solve the technical problem of scheduling SC-PTM services. Thus, the present disclosure can realize the scheduling of the SC-PTM services.

According to an exemplary embodiment, the SC-PTM service includes a currently ongoing service and a to-be-ended service. The to-be-ended service refers to a SC-PTM service which is to be ended in next one or more SC-MCCH modification periods. The currently ongoing service and the to-be-ended service are distinguished using different indicators. For the to-be-ended SC-PTM service, the number of SC-MCCH modification periods at which the SC-PTM service is ended may be indicated. For example, a field of the service identifier (TMGI or G-RNTI) may be followed by an integer I, I=n (n>0) indicates that the service will be ended after n SC-MCCH modification periods, and I=0 indicates that the service is ongoing.

The base station refers to a base station at which a cell sending the SC-PTM service is located. The UE in the embodiments refers to a user device which has a MBMS receiving capability and is interested in receiving the MBMS service.

According to an exemplary embodiment, the base station sends the SC-MCCH on a Physical Downlink Shared Channel (PDSCH) of a unicast subframe.

According to an exemplary embodiment, the TMGI in the SC-MCCH is the service identifier of the SC-PTM, and may be represented by PLMN-ID+Service-ID, usually 3 to 5 bytes. The SC-MTCH is a single cell multicast traffic channel, and is usually indicated by a Logical Link Identifier (LCID), usually 5 bits. The G-RNTI is an identifier of the multicast service on the physical layer, usually 16 bits. The G-RNTI is used for indicating scheduling of the SC-PTM service in the frequency domain of the subframe. When a plurality of SC-MTCHs need to be multiplexed on the MAC layer, the mapping between the TMGI and the LCIDs of the SC-MTCHs is used; otherwise, the mapping is not needed.

According to an exemplary embodiment, the information of the time domain location where the SC-PTM service is includes: configuration information of a wireless frame and a wireless subframe where the SC-PTM service is.

According to an exemplary embodiment, the MCS of the subframe where the SC-PTM service is may be generally indicated by an index number corresponding to the MCS.

According to an exemplary embodiment, in order to increase flexibility of the scheduling, the SC-MCCH may further include, but is not limited to, at least one of the following information: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

According to an exemplary embodiment, the counting request is used for requesting a User Equipment (UE) which receives the SC-PTM service or is interested in receiving the SC-PTM service in a cell to return a feedback, so as to calculate the number of the UEs which receive the SC-PTM service or are interested in receiving the SC-PTM service. The base station may determine whether to stop the SC-PTM transmission according to the number of the UEs.

For example, the counting request information may include the TMGI or the G-RNTI, i.e., the service identifier, and may be specifically indicated by an index number of the service according to an order of the SC-PTM service in the SC-MCCH. It should be noted that the UEs participating in the counting for a single cell may include: UE(s) in a RRC-Idle state (RRC-Idle UE) and UE(s) in an RRC-Connected state (RRC-Connected UE). The number of the RRC-Idle UE may be estimated according to the number of the RRC-Connected UE, and finally the number of the UEs which receive the SC-PTM service and are interested in receiving the SC-PTM service in the cell may be obtained. If there is no RRC-Connected UE which receives or is interested in receiving the SC-PTM service in the cell, i.e., the UEs which needs to be counted are the RRC-Idle UE, a twice-counting scheme may be used.

1) In a first SC-MCCH Modification Period (MP), the number of the RRC-Connected UE are counted; if the number is not equal to zero, the counting is ended; otherwise, the second counting is started.

2) In a second SC-MCCH MP, the number of the RRC-Idle UE are counted. In particular, the counting scheme in UTRAN (Universal Mobile Telecommunications System (UMTS) Terrestrial Radio Access Network) may be used, i.e., calculating the number of the RRC-Idle UE by using a probability factor.

The counting response information sent by the UE may include at least a service identifier, for example, the G-RNTI. In particular, the service identifier may be indicated by an index number of the service according to the order of the SC-PTM service in the SC-MCCH.

According to an exemplary embodiment, the channel quality feedback request is used for requesting the User Equipment (UE) to report a channel quality of a downlink. The information which is requested to be fed back includes: CQI/ACK/NACK and so on.

Taking the CQI as an example, whether the CQI is needed to be fed back may be determined by the downlink DCI format 0, or one bit value of the CSI request in a random access response: 1 represents that the CQI is needed to be fed back, and 0 represents that the CQI is not needed to be fed back. The parameter regarding the CQI feedback may be configured by a high layer signaling, for example, the parameter regarding the CQI feedback may be set by CQI-ReportConfig in RRCConnectionReconfiguration.

In one or more embodiments, the CQI request in the SC-MCCH is mainly used for selecting UE(s) which needs to feed back the CQI, i.e., which UE(s) in a cell may feed the CQI back, or the UE may feed the CQI back under what condition. Considering that there are usually a large number of UEs which receive the SC-PTM service in a cell, and most of the UEs are in the RRC-Idle state, not all the UEs which receive the SC-PTM service need to feed the CQI back, and the CQI is determined by the channel quality (for example, SINR) measured by the UEs, the threshold for determining whether the CQI is needed to be fed back may be set in the SC-MCCH. For example, the threshold may be set as 3 dB; a UE having a CQI lower than 3 dB needs to feed the CQI back, and a UE having a CQI higher than 3 dB does not need to feed the CQI back. Alternatively, the number in a CQI table may be used. For example, the threshold=5, a UE having a CQI lower than 5 needs to report its CQI. The threshold values used herein (and throughout the present disclosure) are examples, and different values may be used in different embodiments.

In addition, the UE(s) which needs to feed the CQI back (for example, a UE at a key location or a UE of key people) may be designated in the SC-MCCH. The eNB may select a proper MCS to send the SC-PTM service according to the CQI feedback from the UE. In the SC-PTM, the eNB may select a MCS which is applicable for the entire cell, and thus the eNB usually determines the MCS of the service according to the UE having a poor CQI.

In addition, whether RRC-Idle UE reports the CQI may be indicated in the CQI feedback request, that is, if the UE in the RRC-Idle state meets a threshold condition, the UE enters into the RRC-Connected state and reports the CQI.

According to an exemplary embodiment, the channel quality feedback request includes at least one of: a Channel Quality Indicator (CQI) threshold by which a CQI is needed to be fed back, an identifier of a User Equipment (UE) which needs to feed the CQI back, and indication information which indicates whether a UE in an idle state feeds the CQI back.

The following descriptions will be made by taking the ACK/NACK as an example.

The ACK/NACK is used for HARQ retransmission. HARQ is realized in LTE unicast transmission by using Stop And Wait (SAW). For example, a downlink HARQ employs asynchronous aperiodic HARQ, that is, after an eNB sends a packet, the eNB waits for a period during which a UE sends information such as ACK/NACK/DTX to the eNB according to the received packet result. After receiving the ACK/NACK, the eNB determines to send a new packet data or retransmits the last packet.

First, in order to support the HARQ function, a HARQ entity may be added in the MAC layer of the SC-MCCH/SC-MTCH.

Second, by a high-layer signaling, the CQI and the ACK/NACK may be set as being sent at the same time. According to the above descriptions about the CQI feedback, sending the CQI and the ACK/NACK at the same time may be indicated in RRC signaling or in the SC-MCCH, that is, the CQI is sent concurrently with the sending of the ACK/NACK. Alternatively, the ACK/NACK may be sent independently and this may be indicated in the SC-MCCH.

Further, in order to save uplink resources, it may be required that only NACK is fed back, that is, the ACK is not needed to be fed back. Further, whether the RRC-Idle UE reports the ACK/NACK may be indicated in the ACK/NACK feedback request. That is to say, the RRC-Idle UE enters the RRC-Connected state and reports the ACK/NACK.

According to an exemplary embodiment, the channel quality feedback request includes at least one of: indication information which indicates whether to feed back an acknowledge response (ACK) and/or a negative acknowledge response (NACK) of a Hybrid Automatic Repeat request (HARQ), and indication information which indicates whether a UE in an idle state feeds back an ACK and/or a NACK of the HARQ.

After an eNB receives the NACK feedback, the eNB retransmits the last data. There are two options for the retransmission: a Point-to-Point (PTP) unicast retransmission or a Point-to-Multipoint (PTM) retransmission. Which retransmission option is selected may be determined or configured in advance by the eNB or operators. For example, the eNB may select the PTP or PTM retransmission according to the number of the received NACKs for the same packet.

It should be noted that a UE needs to be in the RRC-Connected state no matter whether the UE reports the counting response, the CQI report or the ACK/NACK.

According to an exemplary embodiment, the SC-MCCH indication information of the neighboring cell includes: a frequency of the SC-PTM service of the neighboring cell, and an identifier of the SC-PTM service of the neighboring cell. By sending the SC-MCCH indication information of the neighboring cell to a UE, the continuity of the SC-PTM service can be guaranteed. According to an exemplary embodiment, the identifier of the SC-PTM service of the neighboring cell may be the TMGI or G-RNTI.

According to an exemplary embodiment, after the base station sends the SC-MCCH, the UE may listen or receive the SC-MCCH at a location which is indicated in SC-MCCH configuration information in a system broadcast message.

According to an exemplary embodiment, after the UE is powered on, or after a cell is reselected, or after the UE is switched to a new cell, the UE reads the SC-MCCH; or after a SC-MCCH update notification is monitored by the UE, the UE reads the updated SC-MCCH.

The frequency domain scheduling information of the SC-MCCH is sent by the PDCCH of the subframe at which the SC-MCCH is located. For example, the frequency domain scheduling information is sent by Downlink Control Information (DCI) in the PDCCH, and the SC-MCCH RNTI may be indicated by a reserved RNTI, for example, SC-MCCH RNTI=FFFC.

The above DCI at least includes scheduling information of the SC-MCCH in the frequency domain. The UE detects the SC-MCCH subframe as indicated in a system message by employing a SC-MCCH RNTI which is allocated in advance; and if the detection is successful, it is indicated that the PDSCH of the subframe includes the required SC-MCCH information.

According to an exemplary embodiment, after the UE receives the SC-MCCH at the location which is indicated in the SC-MCCH configuration information in the system broadcast message, the UE receives the required SC-PTM service according to a content of the SC-MCCH.

For example, the UE receives a unicast subframe as indicated by time domain location information in the SC-MCCH. The UE performs a mask operation on the unicast subframe using a G-RNTI of interest and verifies a Cyclic Redundancy Check (CRC) value. If the verification is successful, it is indicated that the unicast subframe is the required subframe, and at this time, the UE reads the SC-PTM service corresponding to the G-RNTI of interest according to frequency domain scheduling information as indicated in the PDCCH of the unicast subframe.

According to an exemplary embodiment, if there is the counting request and/or the channel quality feedback request in the SC-MCCH, the UE performs corresponding processes according to the indication and request. For example, the UE reports the counting response and/or the channel quality. If the UE is in the RRC-Idle state, the UE first enters into the RRC-Connected state and then reports the information.

Figure 2:
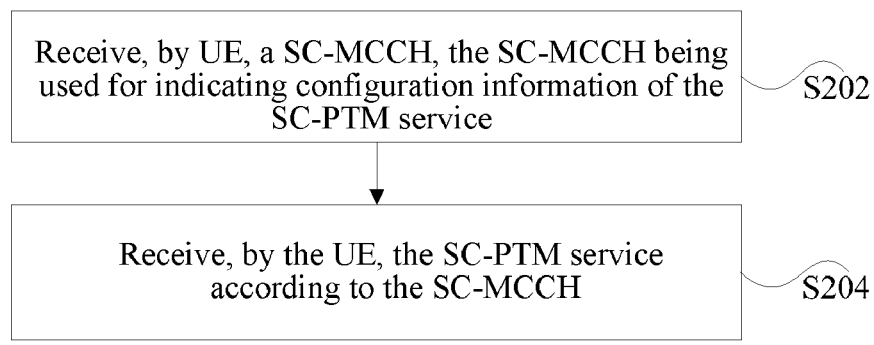
FIG. 2 is a flowchart showing a SC-PTM receiving method according to an embodiment.

The technical solutions described herein further provide a Single Cell Point-to-Multipoint (SC-PTM) service receiving method. FIG. 2 is a flowchart showing a SC-PTM service receiving method according to an embodiment. As shown in FIG. 2, the flow includes the following steps.

In step S202, a UE receives SC-MCCH. The SC-MCCH is used for indicating configuration information of the SC-PTM service.

In step S204, the UE receives the SC-PTM service according to the SC-MCCH.

The SC-MCCH includes: a mapping relationship between an identifier (TMGI) of the SC-PTM service and an identifier (G-RNTI) of the SC-PTM service on the physical layer, information of a time domain location where the SC-PTM service is, and a Modulation and Coding Scheme (MCS) of the SC-PTM service.

The SC-MCCH may further include, but is not limited to, at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

According to an exemplary embodiment, the receiving, by the UE, the SC-MCCH, includes: receiving, by the UE, the SC-MCCH on a Physical Downlink Shared Channel (PDSCH) of a unicast subframe.

According to an exemplary embodiment, the channel quality feedback request includes at least one of: a Channel Quality Indication (CQI) threshold by which a CQI is needed to be fed back, an identifier of a User Equipment (UE) which needs to feed the CQI back, and indication information which indicates whether a UE in an idle state feeds the CQI back.

According to an exemplary embodiment, the channel quality feedback request includes at least one of: indication information which indicates whether to feed back at least one of an acknowledge response (ACK) and a negative acknowledge response (NACK) of a Hybrid Automatic Repeat request (HARQ), and indication information which indicates whether a UE in an idle state feeds back at least one of the ACK and the NACK of the HARQ.

According to an exemplary embodiment, the receiving, by the UE, the SC-MCCH includes: listening or receiving, by the UE, the SC-MCCH at a location which is indicated in SC-MCCH configuration information in a system broadcast message.

According to an exemplary embodiment, the receiving, by the UE, the SC-MCCH includes: after the UE is powered on, or after a cell reselection, or after the UE is switched to a new cell, reading, by the UE, the SC-MCCH; or after the UE monitors a SC-MCCH update notification, reading, by the UE, the updated SC-MCCH.

According to an exemplary embodiment, the receiving, by the UE, the SC-PTM service according to the SC-MCCH includes: receiving, by the UE, a unicast subframe as indicated by the information of the time domain location in the SC-MCCH; performing, by the UE, a mask operation on the unicast subframe by using G-RNTI of interest and verifying a Cyclic Redundancy Check (CRC) value; and if verification is successful, reading, by the UE, the SC-PTM service data corresponding to the G-RNTI of interest according to frequency domain scheduling information as indicated in a Physical Downlink Control Channel (PDCCH) of the unicast subframe.

Through the above descriptions of the embodiments, one of ordinary skill in the art can clearly understand that the methods according to the above embodiments may be implemented by software being executed by a hardware platform, and may also be implemented by hardware itself. In many cases, the former is a better implementation. Based on this understanding, the technical solutions described herein, or the part contributing to the prior art, may be embodied in the form of a software product stored on a storage medium such as a ROM/RAM, a magnetic disk, or an optical disk, several instructions are included in the storage medium to enable a terminal device (which may be a mobile phone, a computer, a server, or a network device) to execute the methods according to individual embodiments.

The technical solutions described herein further provide a Single Cell Multicast Control Channel (SC-MCCH) sending device. The device may be applied in a base station. The device is used for realizing the above embodiments and exemplary embodiments, and repeated descriptions are not provided here. As used below, the term "module" may be used for realizing a combination of software and/or hardware having predetermined functions. Although the devices described in the following embodiments are preferably implemented by software, the implementation by hardware, or by a combination of software and hardware, is also possible and can be conceived.

Figure 3:
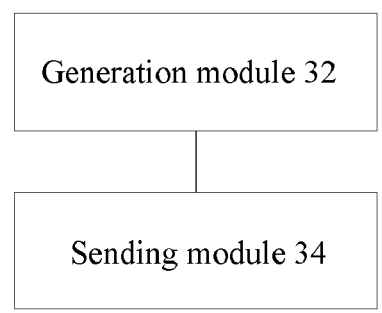
FIG. 3 is a block diagram showing a SC-MCCH sending device according to an embodiment.

FIG. 3 is a block diagram showing a Single Cell Multicast Control Channel (SC-MCCH) sending device according to an embodiment. As shown in FIG. 3, the device may include: a generation module 32 and a sending module 34. The generation module 32 is configured to generate SC-MCCH for indicating configuration information of a Single Cell Point-to-Multipoint (SC-PTM) service. The sending module 34 is coupled to the generation module 32 and is configured to send the SC-MCCH.

The SC-MCCH includes: a mapping relationship between an identifier (TMGI) of the SC-PTM service and an identifier (G-RNTI) of the SC-PTM service on the physical layer, information of a time domain location where the SC-PTM service is, and a Modulation and Coding Scheme (MCS) of the SC-PTM service.

According to an exemplary embodiment, the SC-MCCH may further include at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

The technical solutions described herein further provide a Single Cell Point-to-Multipoint (SC-PTM) service receiving device. The device is applied in a UE. The device is used for realizing the above embodiments and exemplary embodiments, and repeated descriptions are not provided here.

Figure 4:
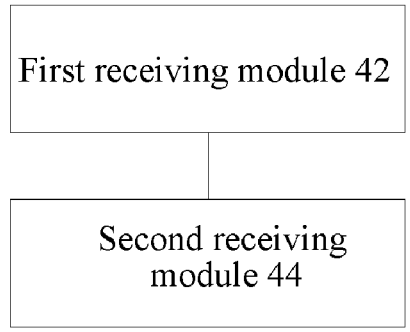
FIG. 4 is a block diagram showing a SC-PTM receiving method according to an embodiment.

FIG. 4 is a block diagram showing a Single Cell Point-to-Multipoint (SC-PTM) service receiving device according to an embodiment. As shown in FIG. 4, the device includes: a first receiving module 42 and a second receiving module 44. The first receiving module 42 is configured to receive SC-MCCH. The SC-MCCH is used for indicating configuration information of the SC-PTM service. The second receiving module 44 is coupled to the first receiving module 42, and is configured to receive the SC-PTM service according to the SC-MCCH.

The SC-MCCH includes: a mapping relationship between an identifier (TMGI) of an identifier (G-RNTI) of the SC-PTM service on the physical layer, information of a time domain location where the SC-PTM service is, and a Modulation and Coding Scheme (MCS) of the SC-PTM service.

According to an exemplary embodiment, the SC-MCCH may further include at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

It should be noted that each of the foregoing modules may be implemented by software or hardware. For the latter, the following implementations may be employed: the foregoing modules are all located in the same processor; or the foregoing modules are respectively located in multiple processors.

An exemplary embodiment further provides a base station which includes the Single Cell Multicast Control Channel (SC-MCCH) sending device as described above.

An exemplary embodiment further provides a user equipment which includes the Single Cell Point-to-Multipoint (SC-PTM) service receiving device as described above.

An exemplary embodiment further provides a computer program product which is configured to carry out the technical solutions described in the above embodiments and exemplary embodiments. The computer program product includes a memory device that has computer executable instructions stored therein, the instructions when executed by a processing unit causes the processing unit to implement the one or more methods described herein.

An exemplary embodiment further provides a storage medium. In the embodiment, the above storage medium may be configured to store program codes which are used for executing the following steps:

In step S102, a base station generates SC-MCCH for indicating configuration information of a SC-PTM service.

In step S104, the base station sends the SC-MCCH.

The SC-MCCH includes: a mapping relationship between an identifier (TMGI) of the SC-PTM service and an identifier (G-RNTI) of the SC-PTM service on the physical layer, information of a time domain location where the SC-PTM service is, and a Modulation and Coding Scheme (MCS) of the SC-PTM service.

According to an exemplary embodiment, the SC-MCCH may further include at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

An exemplary embodiment further provides a storage medium. In the embodiment, the storage medium may be configured to store program codes which are used for executing the following steps:

In step S202, a UE receives SC-MCCH. The SC-MCCH is used for indicating configuration information of the SC-PTM service.

In step S204, the UE receives the SC-PTM service according to the SC-MCCH.

The SC-MCCH includes: a mapping relationship between an identifier (TMGI) of the SC-PTM service and an identifier (G-RNTI) of the SC-PTM service on the physical layer, information of a time domain location where the SC-PTM service is, and a Modulation and Coding Scheme (MCS) of the SC-PTM service.

According to an exemplary embodiment, the SC-MCCH may further include at least one of: a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

According to an exemplary embodiment, the storage medium may include, but is not limited to, various types of medium that may store program codes, such as a USB flash drive, a Read Only Memory (ROM), a Random Access Memory (RAM), a removable hard disk, a magnetic disk, or an optical disk.

Details about the specific implementations of the embodiments may be found in the above descriptions regarding the examples in the above embodiments and exemplary embodiments, and repeated descriptions are not provided here.

In order to make the descriptions herein clearer, the present disclosure is described with reference to the following exemplary embodiments.

An exemplary embodiment provides a SC-MCCH sending method. The method includes:

sending SC-MCCH by a Physical Downlink Shared Channel (PDSCH) of a unicast subframe; the content of the SC-MCCH including one or more of: a mapping relationship between a Temporary Mobile Group Identifier (TMGI) of a Single Cell Point-to-Multipoint (SC-PTM) service and a G-RNTI, information of a time domain location where the SC-PTM service is, single-cell counting request information, and radio downlink channel state information feedback request.

Figure 5:
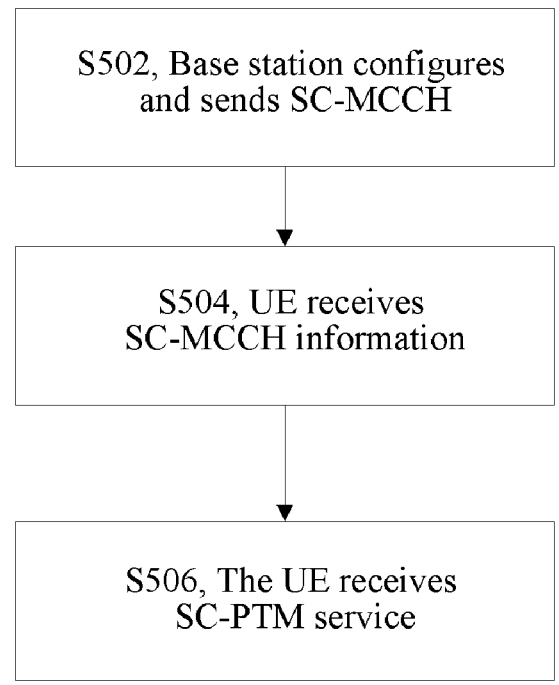
FIG. 5 is a flowchart showing a SC-MCCH sending method according to an exemplary embodiment.

FIG. 5 is a flowchart showing a SC-PTM service receiving method according to an exemplary embodiment. As shown in FIG. 5, the flow includes the following steps.

In step S502, a base station (eNB) configures and sends SC-MCCH information.

In step S504, a UE receives the SC-MCCH information.

In step S506, the UE receives the required service according to the SC-MCCH information.

The flowchart in FIG. 5 will be described with reference to examples and drawings.

First Exemplary Embodiment

Figure 6:
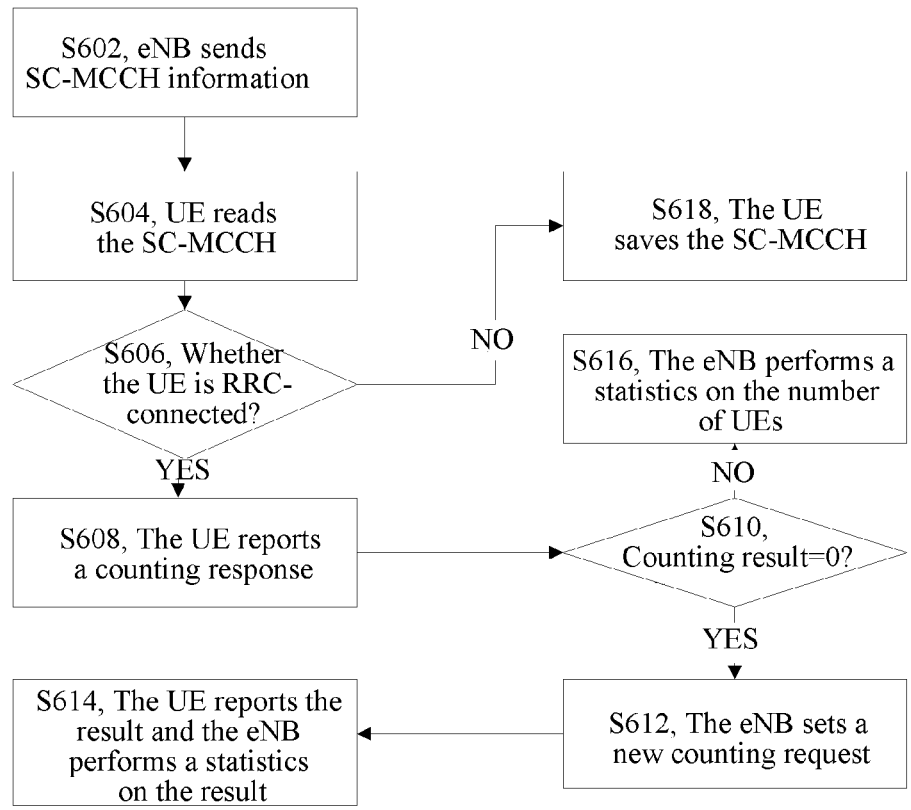
FIG. 6 is a first optional flowchart showing a SC-MCCH sending method according to an exemplary embodiment.

The embodiment relates to a scenario in which the SC-MCCH includes counting request information. As shown in FIG. 6, the flowchart includes the following steps.

In step S602, a base station (eNB) configures and sends SC-MCCH information.

This step is similar to step S502, and the difference resides in that the SC-MCCH includes a counting request. The counting request may at least include one or more TMGIs, that is, to indicate the SC-PTM service on which the counting is performed. The above TMGI may be replaced by a corresponding G-RNTI, or may be indicated by an index number according to the order of the SC-PTM service in the SC-MCCH, for example, the first service in the SC-MCCH may be identified by an index number of 1.

In step S604, the UE reads the SC-MCCH information.

This step is similar to step S504 and repeated descriptions are omitted here.

In step S606, the UE determines whether the UE is in an RRC-Connected state; if yes, the flow proceeds to step S608; otherwise, the flow proceeds to step S618.

The UE may be in an RRC-Idle state or the RRC-Connected state.

The UE refers to a UE which is currently receiving the SC-PTM service as indicated by the counting request in the SC-MCCH or which is interested in receiving the SC-PTM service as indicated by the counting request in the SC-MCCH.

In step S608, the UE reports counting response information.

If the UE is in the RRC-Connected state, and the UE is currently receiving or is interested in receiving the SC-PTM service as indicated by the counting request in the SC-MCCH, the UE reports a counting response. The counting response may include indication information which indicates the services which the UE is interested in. The indication information which indicates the services which the UE is interested in may be service indexes obtained according to an order of the services in the counting request.

In step S610, the eNB calculates the number of UEs and determines whether the number is equal to zero; if the number is equal to zero, the flow proceeds to step S612; otherwise, the flow proceeds to step S616.

If the number of UEs is equal to zero, it is indicated that there is no RRC-Connected UE that is receiving or is interested in receiving the SC-PTM service in the cell, and whether there is a RRC-Idle UE cannot be determined, and thus the eNB needs to perform a second counting, i.e., to calculate the number of the RRC-Idle UE.

In step S612, the eNB sets a new counting request in the SC-MCCH to calculate the number of the RRC-Idle UE.

The new counting request may employ the method of a probability factor. That is, there is a probability, such as 0.5, in the counting request in addition to the SC-PTM service identifier.

In step S614, the UE reports the counting response, the eNB performs a statistics on the counting result, and the flow is ended.

If a UE is in the RRC-Idle state, the UE first selects a value in a range of (0, 1), and then compares the selected value with the probability value in the counting request. For example, if the UE selects 0.4 at random, because 0.4 is smaller than 0.5, the UE enters into the RRC-Connected state and reports the counting response. The eNB calculates the number of the UEs according to the received counting response(s).

Without loss of generality, another possible case is: if the UE selects 0.6 at random, since 0.6 is greater than 0.5, the UE enters the RRC-Connected state and reports the counting response.

In step S616, the eNB calculates the number of the UEs and the flow is ended.

By the above steps, the number of the UEs in the RRC-Connected state may be obtained. Considering that most of the UEs which are interested in receiving the SC-PTM service in a cell are UEs in the RRC-Idle state, the eNB may estimate the number of the UEs in the RRC-Idle state according to the obtained number of the UEs in the RRC-Connected state. Generally, in a cell, there is a ratio between the number of the UEs in the RRC-Idle state and the number of the UEs in the RRC-Connected state, for example, 10:1, and the ratio may be obtained by operators according to statistics of the network operations. Assuming that the number of the RRC-Connected UEs is 3 and the ratio is 10, the total number of the UEs is: 3*(10+1)=33. That is to say, there are a total of 33 UEs in the cell which are receiving or are interested in receiving a certain SC-PTM service.

In step S618, the UE saves the SC-MCCH information.

The RRC-Idle UE does not need to report the counting response, the RRC-Idle UE saves the SC-MCCH information, and the flow is ended.

Second Exemplary Embodiment

Figure 7:
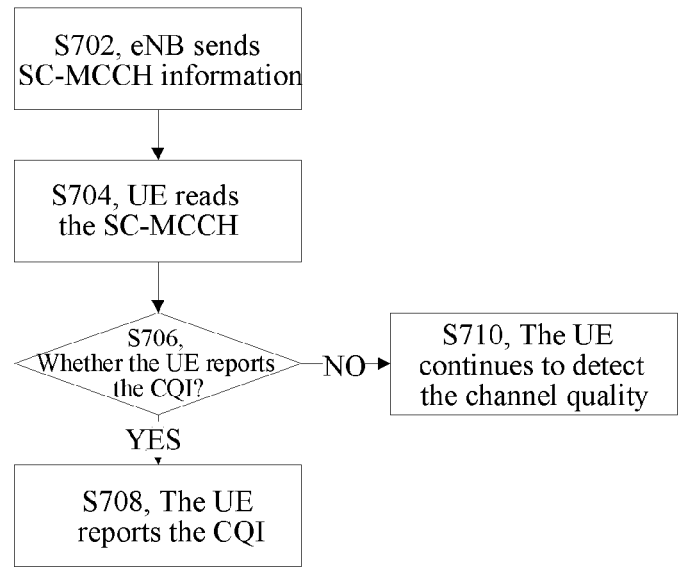
FIG. 7 is a second optional flowchart showing a SC-MCCH sending method according to an exemplary embodiment.

The embodiment relates to a scenario in which the SC-MCCH includes a Channel Quality Indicator (CQI) feedback request. As shown in FIG. 7, the flowchart includes the following steps.

In step S702, a base station (eNB) configures and sends SC-MCCH information.

This step is similar with step S502, and the difference resides in that the SC-MCCH includes a CQI feedback request. The CQI feedback request may include a criterion for CQI feedback. Specifically, the CQI feedback request at least includes: a feedback threshold, i.e., a channel condition for feeding the CQI back. Assuming that the feedback threshold is equal to 3 dB, if a UE detects that the downlink channel SINR/SNR<3 dB, the UE reports the CQI. Without loss of generality, the feedback request may be a value (for example, 5) in a CQI table, then when the CQI measured and calculated by a UE is lower than 5, the UE reports the CQI; otherwise, the UE does not report the CQI. Whether to report the CQI and how to report the CQI should be consistent with the existing specifications, for example, the setting of CQI request indication bit in DCI0, and the CQI report configuration in the RRC signaling, and so on.

According to an exemplary embodiment, the CQI request further includes: a SC-PTM service identifier, for example, the TMGI or the G-RNTI, or may be an index number which indicates the order of the SC-PTM service in the SC-MCCH.

In step S704, the UE receives the SC-MCCH information.

This step is similar with step S504, and hence the description is not repeated here.

In step S706, the UE determines whether to report the CQI; if yes, the flow proceeds to step S708; otherwise, the flow proceeds to step S710.

It should be noted that it is assumed here that the CQI request bit in the DCI0 has been set as 1, and parameters such as a type/location of the CQI have been set in a corresponding RRC signaling (for example, RRCConnectionReconfiguration or RRCConnectionSetup). The UE compares the measurement result with the CQI threshold in the SC-MCCH; if the measurement result is smaller than the CQI threshold, the UE reports the CQI; otherwise, the UE does not report the CQI.

In step S708, the UE calculates and reports the CQI.

If the UE determines to report the CQI, the UE calculates a corresponding CQI index according to the measured SINR/SNR value, and reports the obtained CQI to the eNB. Later, the eNB selects a proper MCS to send the SC-PTM according to the CQI reported by the UE. Considering that a plurality of UEs may report different CQIs, the eNB generally selects a MCS to send the SC-PTM according to the lowest CQI, because a certain SC-PTM service in one cell employs the same MCS.

In addition to the CQI value, the UE may also report a corresponding SC-PTM service identifier. Specifically, the index number of the SC-PTM service in the CQI request may be used, or TMGI or G-RNTI may be used.

The reported information may be sent by the PUCCH or the PUSCH.

In step S710, the UE continues to detect the channel quality according to the SC-MCCH indication.

If the UE determines that the CQI is not to be reported, for example, the channel quality of the UE is relatively good, the UE continues to detect the channel quality according to the indication of the RRC signaling and reports the CQI if a report condition is met.

Third Exemplary Embodiment

Figure 8:
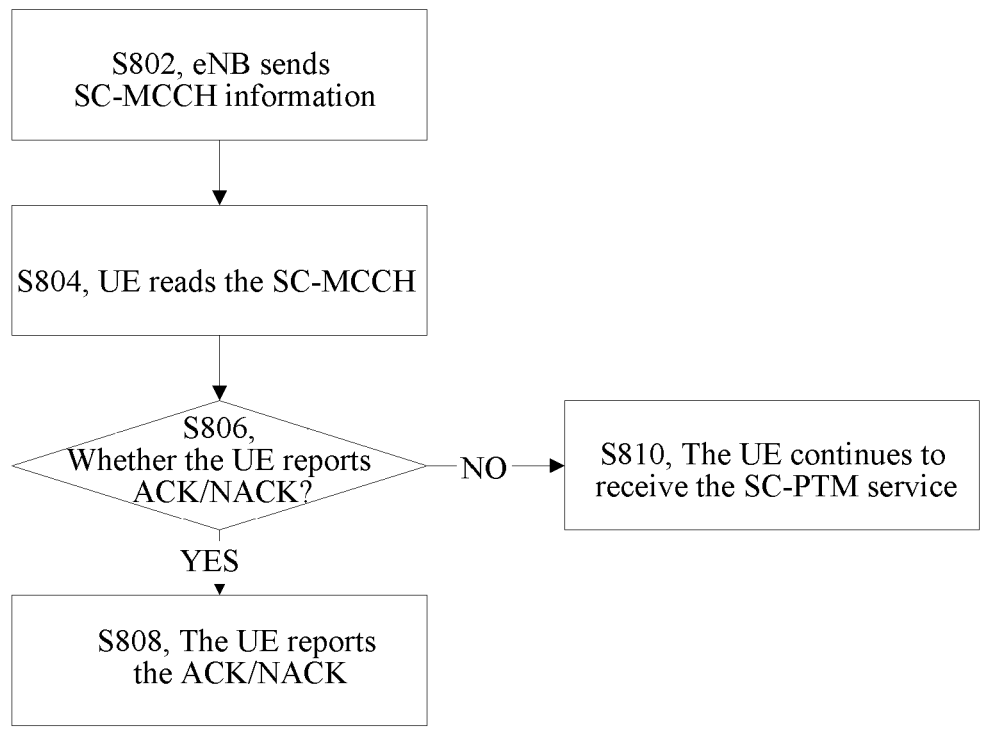
FIG. 8 is a third optional flowchart showing a SC-MCCH sending method according to an exemplary embodiment.

The embodiment relates to a scenario in which the SC-MCCH includes ACK/NACK request information. As shown in the flowchart of FIG. 8, the method includes the following steps.

In step S802, a base station (eNB) configures and sends SC-MCCH information.

This step is similar with step S502, and the difference resides in that the SC-MCCH includes an ACK/NACK feedback request. The ACK/NACK feedback request at least includes a NACK feedback, and further includes information which indicates whether RRC-Idle UE needs to feed back, that is, information regarding whether the RRC-Idle UE needs to enter into the RRC-Connected state and then report. The NACK feedback refers to that if a UE determines that the feedback is the NACK, the UE reports the NACK, and ACK is not needed to be reported.

Without loss of generality, the above feedback request may be reporting of the ACK/NACK no matter whether the response is ACK or NACK. For example, both ACK and NACK are reported, or neither of the ACK and NACK is reported.

According to an exemplary embodiment, the ACK/NACK request may further include: the SC-PTM service identifier, for example, the TMGI or the G-RNTI, or may be the index number of an arrangement order of the SC-PTM service in the SC-MCCH.

Whether the ACK/NACK may be reported and how to report the ACK/NACK is consistent with the existing specifications, for example, the CQI report configuration in the RRC signaling (for example, RRCConnectionReconfiguration or RRCConnectionSetup), that is, the location of reporting the ACK/NACK which is determined according to the indication of the RRC signaling.

In step S804, the UE reads the SC-MCCH information.

This step is similar with step S504, and the description is not repeated here.

In step S806, the UE determines whether to report the ACK/NACK; if yes, the method proceeds to step S808; otherwise, the method proceeds to step S810.

The UE determines whether to report the ACK/NACK according to the decoding result; if the decoding is correct, the UE does not report the ACK/NACK; otherwise, the UE reports the NACK. In addition, if it is indicated in the SC-MCCH that a UE in the RRC-Idle state is to be reported, the UE enters into the RRC-Connected state and reports the ACK/NACK.

In step S808, the UE reports the ACK/NACK.

The UE reports the ACK/NACK according to the signaling configuration in the existing specifications. The ACK/NACK may be reported concurrently with the report of the CQI, or may be reported independently. The reported information may be sent by the PUCCH or the PUSCH.

Further, in addition to the ACK/NACK value, the UE may also report a corresponding SC-PTM service identifier. Specifically, the index number of the SC-PTM service in the ACK/NACK request may be used, or TMGI or G-RNTI may be used.

In step S810, the UE continues to receive the SC-PTM data.

If the UE determines not to report the ACK/NACK, the UE continues to receive the SC-PTM data, and continues to determine whether the ACK/NACK is to be reported.

Fourth Exemplary Embodiment

Figure 9:
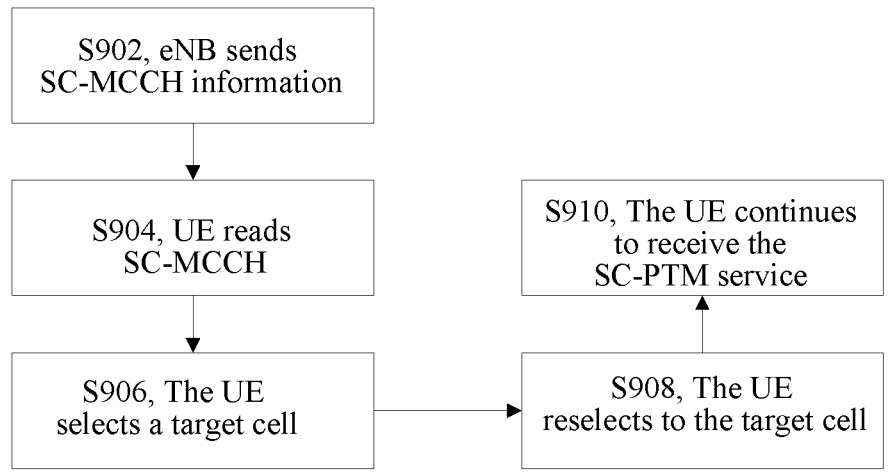
FIG. 9 a fourth optional flowchart showing a SC-MCCH sending method according to an exemplary embodiment.

The embodiment relates to a cell reselection scenario of a UE. As shown in the flowchart in FIG. 9, the method includes the following steps.

In step S902, a base station (eNB) configures and sends SC-MCCH information.

In step S904, a UE reads the SC-MCCH information.

In step S906, the UE selects a target neighboring cell.

The UE selects the neighboring cell according to neighboring cell information in the SC-MCCH. The target neighboring cell refers to a neighboring cell which may provide the SC-PTM service as required by the UE. The neighboring cell information includes at least a frequency and a SC-PTM service identifier. The UE may determine the target cell according to whether the above frequency is supported and the required SC-PTM service.

In step S908, the UE reselects to the target neighboring cell.

The UE may enter into the neighboring cell by the cell reselection procedure.

In step S910, the UE continues to receive the required SC-PTM service in the target cell.

The UE receives the SC-MCCH information in the target cell, and continues to receive the required SC-PTM service according to the indication of the SC-MCCH.

Figure 10:
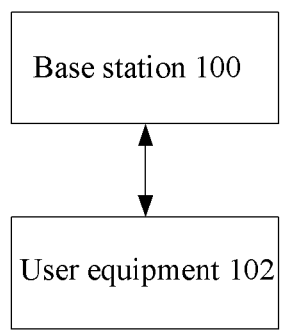
FIG. 10 is a block diagram showing a structure of a SC-MCCH sending system according to an exemplary embodiment.

An exemplary embodiment further provides a SC-MCCH sending system. As shown in FIG. 10, the system may include: a base station 100 and a user equipment 102.

The base station 100 is configured to configure and send the SC-MCCH information and the SC-PTM service data. The base station 100 is further configured to scramble the CRC of the SC-MCCH subframe by using the SC-MCCH RNTI.

The UE 102 is configured to receive the SC-MCCH information and the SC-PTM service data sent by the base station 100. The UE 102 is further configured to detect the SC-MCCH subframe according to the SC-MCCH RNTI and detect the SC-PTM service subframe according to the G-RNTI. The UE 102 is further configured to report the counting response and the CQI/ACK/NACK.

Figure 11:
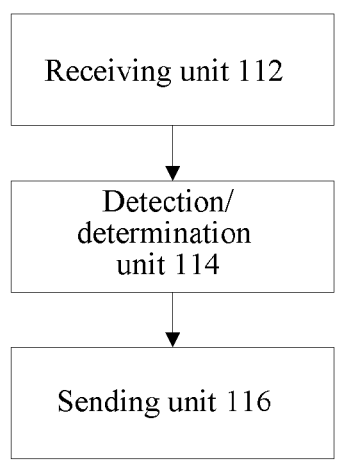
FIG. 11 is a block diagram showing a structure of user equipment according to an exemplary embodiment.

An exemplary embodiment also provides a user equipment. As shown in FIG. 11, the user equipment includes: a receiving unit 112, a detection/determination unit 114, and a sending unit 116.

The receiving unit 112 is configured to receive the SC-MCCH information and the SC-PTM service data.

The detection/determination unit 113 is configured to detect the SC-MCCH subframe and the SC-PTM service subframe using particular SC-MCCH RNTI and G-RNTI. The detection/determination unit 113 is further configured to determine whether to report the counting response and the CQI/ACK/NACK.

The sending unit 116 is configured to report the counting response and the CQI/ACK/NACK.

In summary, by the exemplary embodiments provided herein, the flexibility in frequency domain scheduling of the single cell multicast service can be improved, the reliability in transmission of the single cell multicast service can be enhanced, and the single cell multicast service can be transmitted by the PDSCH of a unicast subframe.

It should be understood by one of ordinary skill in this art that the system and user equipment described herein for indicating the single cell SC-MCCH design are designed to implement the foregoing methods regarding the single cell SC-MCCH design. Details about the implementation of each of the foregoing processing units can be found and understood from the descriptions regarding previous methods. The function of each processing unit in the drawings can be realized by a program running on a processor or by a specific logic circuit.

In one or more examples, each module or each step described above can be implemented by general purpose computing devices, which can be centralized on a single computing device or distributed over a network formed by multiple computing devices. Alternatively, each module or each step may be implemented with program codes executable by a computing device. The program codes may be stored in a storage device for execution by a computing device. In some cases, the steps may be executed in an order different from that described herein. Alternatively, the modules may be fabricated into individual integrated circuit modules. Alternatively, a plurality of modules or steps may be fabricated into a single integrated circuit module. Accordingly, the present disclosure is not limited to any particular combination of hardware and software.

The exemplary embodiments described above are not intended to limit the present disclosure. One of ordinary skill in this art may make any changes or modifications. Any modifications, equivalent replacements, improvements and so on without departing from the spirit and principle of the present disclosure should be encompassed in the protection scope of the present disclosure.

INDUSTRIAL APPLICABILITY

The above technical solutions provided by the embodiments described herein may be applied in the procedure for sending the single cell multicast control channel. The base station generates SC-MCCH for indicating configuration information of a SC-PTM service and the base station sends the SC-MCCH. The SC-MCCH includes at least one of a mapping relationship between the TMGI and the LCID of the SC-MTCH, a counting request, a channel quality feedback request, and a manner of SC-MCCH indication information of a neighboring cell. The embodiments described herein can solve the technical problem in related art that there is no effective solution for scheduling SC-PTM services in the related art. Thus, the present disclosure can realize scheduling of the SC-PTM services.

What is claimed is:

1. A Single Cell Multicast Control Channel (SC-MCCH) sending method, comprising:
   generating, by a base station, SC-MCCH information for indicating configuration information of a Single Cell Point-to-Multipoint (SC-PTM) service; and
   sending, by the base station, the SC-MCCH information;
   wherein the SC-MCCH information comprises: a mapping relationship between a Temporary Mobile Group Identifier (TMGI) of the SC-PTM service and a Group Radio Network Temporary Identifier (G-RNTI), and information of a time domain location where the SC-PTM service is,
   wherein the information of the time domain location where the SC-PTM service is comprises:
   configuration information of a wireless frame and a wireless subframe where the SC-PTM service is.

2. The method according to claim 1, wherein the SC-MCCH information further comprises at least one of:
   a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

3. The method according to claim 1, wherein the SC-PTM service comprises:
   a currently ongoing SC-PTM service and a to-be-ended SC-PTM service;
   wherein the to-be-ended SC-PTM service refers to a SC-PTM service which is to be ended in next one or more SC-MCCH modification periods; the currently ongoing SC-PTM service and the to-be-ended SC-PTM service are distinguished using different indicators in the SC-MCCH information; and for the to-be-ended SC-PTM service, the number of the SC-MCCH modification periods at which the SC-PTM service is ended is indicated in the SC-MCCH information.

4. The method according to claim 1, wherein the sending, by the base station, the SC-MCCH information comprises:
   sending, by the base station, the SC-MCCH information on a Physical Downlink Shared Channel (PDSCH) of a unicast subframe.

5. The method according to claim 1, wherein when a plurality of Single Cell Multicast Traffic Channels (SC-MTCHs) need to be multiplexed on a Media Access Control (MAC) layer, the SC-MCCH information comprises:
   a mapping relationship between the TMGI and Logical Channel Identifiers (LCID) of the SC-MTCHs.

6. The method according to claim 2, wherein the channel quality feedback request is used for requesting a User Equipment (UE) to report a channel quality of a downlink, and
   wherein the channel quality feedback request comprises at least one of:

a Channel Quality Indicator (CQI) threshold by which a CQI is needed to be fed back, an identifier of a User Equipment (UE) which needs to feed back the CQI, and indication information which indicates whether a UE in an idle state feeds back the CQI;

or, the channel quality feedback request comprises at least one of:

indication information which indicates whether to feed back at least one of an acknowledge response (ACK) and a negative acknowledge response (NACK) of a Hybrid Automatic Repeat request (HARQ), and indication information which indicates whether a UE in an idle state feeds back at least one of the ACK and the NACK of the HARQ.

7. The method according to claim 2, wherein the SC-MCCH indication information of the neighboring cell comprises:

a frequency of the SC-PTM service of the neighboring cell, and an identifier of the SC-PTM service of the neighboring cell.

8. The method according to claim 1, wherein after the base station sends the SC-MCCH information, the method further comprises:

listening or receiving, by a User Equipment (UE), the SC-MCCH information at a location which is indicated in SC-MCCH configuration information of a system broadcast message.

9. The method according to claim 8, wherein the listening or receiving, by the User Equipment (UE), the SC-MCCH information at the location which is indicated in the SC-MCCH configuration information of the system broadcast message, comprises:

after the UE is powered on, or after reselecting a cell, or after switching to a new cell, reading, by the UE, the SC-MCCH information; or after a SC-MCCH update notification is monitored, reading, by the UE, updated SC-MCCH information, wherein after the UE receives the SC-MCCH information at the location which is indicated in the SC-MCCH configuration information of the system broadcast message, the method comprises:

receiving, by the UE, a required SC-PTM service according to a content of the SC-MCCH information, and wherein the receiving, by the UE, the SC-PTM service according to the SC-MCCH information, comprises:

receiving, by the UE, a unicast subframe as indicated by the information of the time domain location in the SC-MCCH information;

performing a mask operation on the unicast subframe by using a G-RNTI of interest and verifying a Cyclic Redundancy Check (CRC) value, by the UE; and when the verification is successful, reading, by the UE, the SC-PTM service corresponding to the G-RNTI of interest according to frequency domain scheduling information as indicated in a Physical Downlink Control Channel (PDCCH) of the unicast subframe.

10. A Single Cell Point-to-Multipoint (SC-PTM) service receiving method, comprising:

receiving, by a User Equipment (UE), a Single Cell Multicast Control Channel (SC-MCCH) information, wherein the SC-MCCH information is used for indicating configuration information of the SC-PTM service; and receiving, by the UE, the SC-PTM service according to the SC-MCCH information;

wherein the SC-MCCH information comprises: a mapping relationship between a Temporary Mobile Group Identifier (TMGI) of the SC-PTM service and a Group Radio Network Temporary Identifier (G-RNTI), information of a time domain location where the SC-PTM service is, and a Modulation and Coding Scheme (MCS) of the SC-PTM service, wherein the information of the time domain location where the SC-PTM service is comprises:

configuration information of a wireless frame and a wireless subframe where the SC-PTM service is.

11. The method according to claim 10, wherein the SC-MCCH information further comprises at least one of:

a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

12. The method according to claim 10, wherein the receiving, by the UE, the SC-MCCH information, comprises:

receiving, by the UE, the SC-MCCH information on a Physical Downlink Shared Channel (PDSCH) of a unicast subframe.

13. The method according to claim 11, wherein the channel quality feedback request comprises at least one of:

a Channel Quality Indication (CQI) threshold by which a CQI is needed to be fed back, an identifier of a User Equipment (UE) which needs to feed back the CQI, and indication information which indicates whether a UE in an idle state feeds back the CQI, or, wherein the channel quality feedback request comprises at least one of:

indication information which indicates whether to feed back at least one of an acknowledge response (ACK) and a negative acknowledge response (NACK) of a Hybrid Automatic Repeat request (HARQ), and indication information which indicates whether a UE in an idle state feeds back at least one of the ACK and the NACK of the HARQ.

14. The method according to claim 11, wherein the receiving, by the UE, the SC-MCCH information comprises:

listening or receiving, by the UE, the SC-MCCH information at a location which is indicated in SC-MCCH configuration information in a system broadcast message.

15. The method according to claim 10, wherein the receiving, by the UE, the SC-MCCH information comprises:

after the UE is powered on, or after reselecting a cell, or after switching to a new cell, reading, by the UE, the SC-MCCH information; or after a SC-MCCH update notification is monitored, reading, by the UE, updated SC-MCCH information.

16. The method according to claim 10, wherein the receiving, by the UE, the SC-PTM service according to the SC-MCCH information comprises:

receiving, by the UE, a unicast subframe as indicated by the information of the time domain location in the SC-MCCH information;

performing a mask operation on the unicast subframe by using G-RNTI of interest and verifying a Cyclic Redundancy Check (CRC) value, by the UE; and when the verification is successful, reading, by the UE, SC-PTM service data corresponding to the G-RNTI of interest according to frequency domain scheduling information as indicated in a Physical Downlink Control Channel (PDCCH) of the unicast subframe.

17. A Single Cell Point-to-Multipoint (SC-PTM) service receiving device, applied in a User Equipment (UE), wherein the device comprises:
- a processor; and
- a memory for storing instructions executable by the processor;
- wherein the processor is configured to:
- receive Single Cell Multicast Control Channel (SC-MCCH) information, wherein the SC-MCCH information is used for indicating configuration information of the SC-PTM service; and
- receive the SC-PTM service according to the SC-MCCH;
- wherein the SC-MCCH information comprises: a mapping relationship between a Temporary Mobile Group Identifier (TMGI) of the SC-PTM service and a Group Radio Network Temporary Identifier (G-RNTI), information of a time domain location where the SC-PTM service is, and a Modulation and Coding Scheme (MCS) of the SC-PTM service,
- wherein the information of the time domain location where the SC-PTM service is comprises:
- configuration information of a wireless frame and a wireless subframe where the SC-PTM service is.

18. The device according to claim 17, wherein the SC-MCCH information further comprises at least one of:
- a mapping relationship between the TMGI and a Logical Channel Identifier (LCID) of a Single Cell Multicast Traffic Channel (SC-MTCH), a counting request, a channel quality feedback request, and SC-MCCH indication information of a neighboring cell.

* * * * *